(12) United States Patent
Andrew

(10) Patent No.: US 8,620,667 B2
(45) Date of Patent: Dec. 31, 2013

(54) FLEXIBLE SPEECH-ACTIVATED COMMAND AND CONTROL

(75) Inventor: Felix Andrew, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1736 days.

(21) Appl. No.: 11/251,681

(22) Filed: Oct. 17, 2005

(65) Prior Publication Data

US 2007/0088556 A1 Apr. 19, 2007

(51) Int. Cl.
*G10L 15/00* (2013.01)
*G10L 15/22* (2006.01)
*G10L 15/18* (2013.01)

(52) U.S. Cl.
USPC ........ 704/275; 704/270.1; 704/257; 704/251; 704/231

(58) Field of Classification Search
USPC ................ 704/257, 251, 231, 275, 270.1
See application file for complete search history.

(56) References Cited

U.S. PATENT DOCUMENTS

| | | | | |
|---|---|---|---|---|
| 5,748,191 A * | 5/1998 | Rozak et al. | ................. | 715/728 |
| 5,826,051 A * | 10/1998 | Porter et al. | ................. | 715/810 |
| 6,047,260 A * | 4/2000 | Levinson | ......................... | 705/9 |
| 6,192,339 B1 * | 2/2001 | Cox | ............................. | 704/270 |
| 6,233,559 B1 * | 5/2001 | Balakrishnan | ................ | 704/275 |
| 6,513,006 B2 * | 1/2003 | Howard et al. | ............... | 704/257 |
| 6,604,075 B1 * | 8/2003 | Brown et al. | ............. | 704/270.1 |
| 6,615,172 B1 * | 9/2003 | Bennett et al. | ................ | 704/257 |
| 6,633,846 B1 * | 10/2003 | Bennett et al. | ................ | 704/257 |
| 6,665,640 B1 * | 12/2003 | Bennett et al. | ................ | 704/257 |
| 6,999,930 B1 * | 2/2006 | Roberts et al. | ............. | 704/270.1 |
| 7,050,977 B1 * | 5/2006 | Bennett | ..................... | 704/270.1 |
| 7,143,039 B1 * | 11/2006 | Stifelman et al. | ............ | 704/270 |
| 7,206,747 B1 * | 4/2007 | Morgan et al. | ............... | 704/275 |
| 7,222,073 B2 * | 5/2007 | Julia et al. | ..................... | 704/257 |
| 7,392,185 B2 * | 6/2008 | Bennett | ......................... | 704/243 |
| 7,712,031 B2 * | 5/2010 | Law et al. | ..................... | 715/728 |
| 2002/0051074 A1 * | 5/2002 | Kawaoka et al. | ............ | 348/376 |
| 2002/0071577 A1 * | 6/2002 | Lemay et al. | ................. | 381/110 |
| 2003/0004728 A1 * | 1/2003 | Keiller | .......................... | 704/275 |
| 2003/0120493 A1 * | 6/2003 | Gupta | ........................... | 704/270.1 |
| 2003/0163321 A1 * | 8/2003 | Mault | .......................... | 704/270 |
| 2003/0177013 A1 * | 9/2003 | Falcon et al. | ................ | 704/275 |
| 2004/0024720 A1 * | 2/2004 | Fairweather | .................... | 706/46 |
| 2005/0234727 A1 * | 10/2005 | Chiu | .......................... | 704/270.1 |
| 2006/0074980 A1 * | 4/2006 | Sarkar | ......................... | 707/104.1 |
| 2007/0050191 A1 * | 3/2007 | Weider et al. | ................. | 704/275 |

* cited by examiner

*Primary Examiner* — Paras D Shah
*Assistant Examiner* — Abdelali Serrou
(74) *Attorney, Agent, or Firm* — Kelly, Holt & Christenson PLLC

(57) ABSTRACT

A collection of human language terms is obtained. The terms describe a system resource. At least one term in the collection does not describe the identify of the resource. The collection of human language terms is incorporated into a grammar. The grammar is utilized as a basis for identifying spoken user commands.

18 Claims, 8 Drawing Sheets

FLEXIBLE SPEECH-ACTIVATED COMMAND AND CONTROL

BACKGROUND

Developers of speech-activated command and control systems are confronted with a relatively unique challenge in that, unlike most other computer-implemented means for supporting user input, there is typically no visible indication of available alternatives for input operations. Thus, when a user sits down in front of a machine, it is often difficult for him or her to decide what they are going to say. The user often has been conditioned to point and click as they seek to discover available functions and command alternatives. Performing similar exploration through spoken utterances can be, for many, a more intimidating process. It can be difficult for individuals to choose words with any kind of certainty that they will be connected with a desirable input operation.

A common user-initiated operation is the launching of a software application. A logical way to support speech-activation of such an operation is to configure the speech interface to listen for an initial action word (e.g., launch, run, start, etc.) followed by the name of an application (e.g., Microsoft Word, Microsoft Excel, etc.). A problem with this approach is that it requires a user to be equipped with a significant amount of knowledge as to what name or names have been assigned to various applications.

In some cases, a user will likely be familiar with the most probable application identifiers, such as when the user purchases a specific software application and installs it on their own machine. In other cases, familiarity is less likely. For example, many machines come pre-bundled with numerous software applications. Often times a purchaser of such a machine doesn't buy based on the value-added software but more based on other differentials such as price and/or hardware capabilities. This is just one example of a situation in which a user may not be familiar with available software applications.

Users that experiment with speech-activated command and control will often choose more general terminology over the more specific. For example, a user that purchases a machine having a TV card might choose to say "start television" rather than "start Video Viewer 5," the latter being the actual name of the desired application. These types of misses can frustrate or discourage a user, sometimes causing them to give up on voice activated functionality all together.

The discussion above is merely provided for general background information and is not intended for use as an aid in determining the scope of the claimed subject matter. Further, it should also be emphasized that the claimed subject matter is not limited to implementations that solve any or all of the disadvantages of any currently known systems noted in this section.

SUMMARY

A collection of human language terms is obtained. The terms describe a system resource. At least one term in the collection does not describe the identify of the resource. The collection of human language terms is incorporated into a grammar. The grammar is utilized as a basis for identifying spoken user commands.

This Summary is provided to introduce concepts in a simplified form that are further described below in the Detailed Description. This Summary is not intended to identify key features or essential features of the claimed subject matter, nor is it intended for use as an aid in determining the scope of the claimed subject matter.

DETAILED DESCRIPTION

Figure 1:
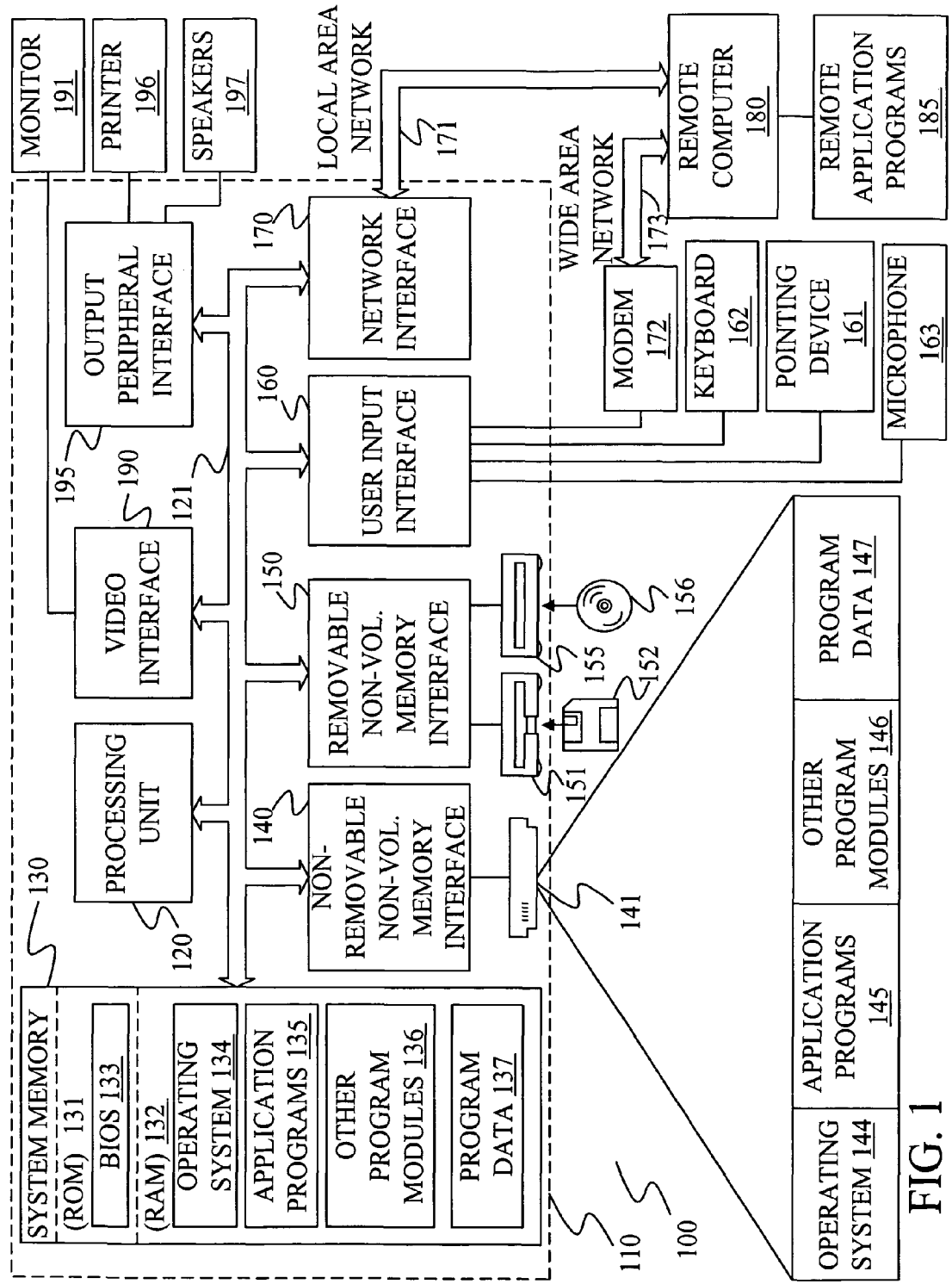
FIG. 1 is a block diagram of one computing environment in which some embodiments may be practiced.

FIG. 1 illustrates an example of a suitable computing system environment 100 in which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
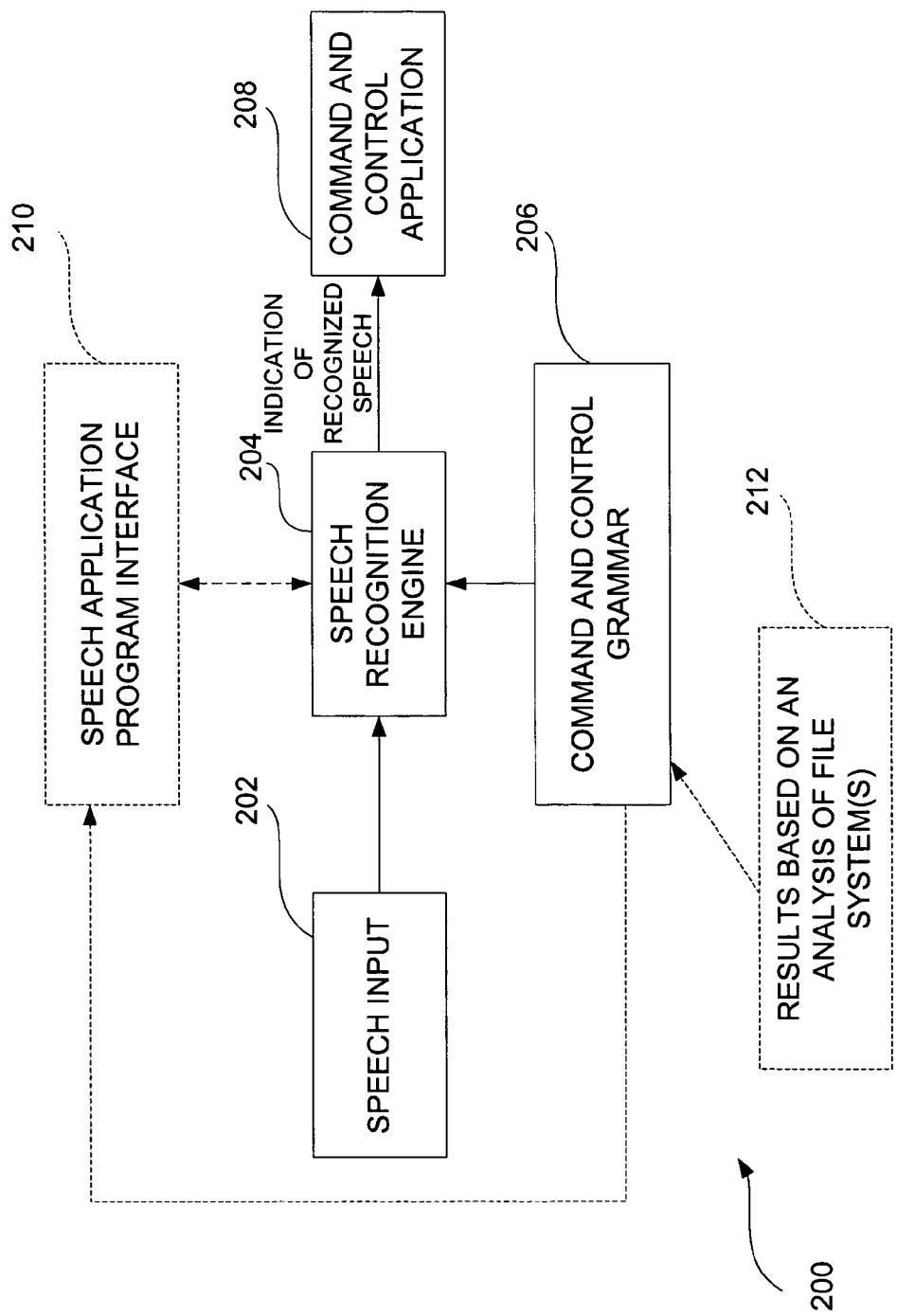
FIG. 2 is a simplified schematic illustration of a speech-activated command and control system.

FIG. 2 is a simplified schematic illustration of a speech-activated command and control system 200. System 200 includes a speech recognition engine 204 configured to receive speech input 202. Engine 204 illustratively includes software drivers generally configured to capture and digitize the sound waves of a user's voice, illustratively the sound waves associated with speech input 202. Engine 204 is also configured to then convert the sound waves to basic language units or phonemes. Words are then determined based on the phonemes. Those skilled in the art will appreciate that other means for determining words based on input are certainly within the scope of the present invention.

It should be noted that speech recognition engine 204, in actual implementation, may not be a single, unified component. For example, as is shown in dotted lines in FIG. 2, the actual system architecture may incorporate functionality of a speech application program interface 210. One example, not by limitation, of such an interface is SAPI 5.0 offered by Microsoft Corporation of Redmond, Wash. as part of their Windows XP operating system. Generally speaking, SAPI 5.0 is a software layer that allows a speech-enabled application (e.g., application 208) to communicate with a speech recognition engine (e.g., engine 204).

SAPI 5.0 gives developers, among other things, a rich set of speech services for building high-performance applications that run on desktop, mobile, and server platforms. With SAPI 5.0, a speech-enabled application and a speech recognition engine do not communicate directly with each other; all communication is instead done via SAPI. In addition, SAPI takes responsibility for a number of functions in a speech system, including the loading of grammar files, a function that will be described below in the context of system 200. As is shown in FIG. 2, grammar files may be provided to SAPI instead of to the actual recognition engine 204. The present discussion of SAPI 5.0 is intended simply to underscore the fact that actual implementation of system 200 may be more complex than the illustration of FIG. 2.

Speech recognition engine 204 can be configured to incorporate the functionality of one or more supplemental analytical tools to support a correct interpretation of words associated with input 202. For example, recognition engine 202 can be configured to contextually analyze words to ensure correct interpretation for words that sound alike (such as write and right). In another example, recognition engine 202 can be configured to incorporate a speaker profile (not illustrated) into the analysis, thereby enabling the engine to accommodate a particular user's distinct speech patterns and accent. Those skilled in the art will appreciate that these and other enhancements should be considered within the scope of the present invention.

In order to support a desirable level of speed and accuracy, speech recognition engine 204 also incorporates a grammar 206. Grammar 206 defines a set of recognized words. Generally speaking, grammar 206 supplies recognition engine 204 with an expectation of what might be said. The recognition engine 204 will illustratively incorporate this expectation into the analysis of determining what was said. In the command and control context, grammar 206 will include a list of words associated with commands or control instructions.

As is illustrated in FIG. 2, an indication of recognized speech (e.g., a textual representation) is forwarded to a command and control application 208. Application 208 is illustratively configured to facilitate any of a variety of functions based on the output of engine 204. Such functions might include, but are not limited to, navigating menus, retrieving data, navigating toolbars, and navigating application dialogs.

System 200 can be implemented so as to enable a user to utilize a speech-activated command to initiate loading (or otherwise initiate use) of a software application. An example will now be provided. A particular speech input 202 illustratively corresponds to a spoken utterance comprising "start video viewer express," wherein Video Viewer Express is an application designed to enable a viewer to watch movies. Grammar 206 illustratively includes an indication of "start" and "video viewer express" as terms that very well might be included in a command. Speech recognition engine 204 analyzes the utterance in light of grammar 206 and determines that the textual components of the utterance include "start video viewer express". An indication of this recognized speech is then provided to application 208. Based on this information, application 208 supports an immediate loading of the Video Viewer Express application.

When system 200 is utilized, as the example suggests, as means for initiating the loading of software applications, there is some issue as to how to determine what type of information should be included in grammar 206. The grammar will assumedly include action words (e.g., run, launch, load, start, etc.) that serve as an indication that the user desires to initiate use of an application. The challenge lies in determining what words to include as indicators of which application to load.

One option is to include actual names of applications in grammar 206. As is indicated in FIG. 2 as optional block 212, such names can be derived based on analysis of one or more file systems to which the user has access. When a piece of software is installed, it is generally true that related files are copied to a storage medium, often a hard drive. These files will often include at least one link file that serves as a short cut to an executable file.

Link files are often associated with a name that represents a relatively user-friendly indication of the application itself. Further, the names associated with link files are often prominently displayed to the user, thereby informing their vocabulary as to how the application is likely to be referred to within the framework of the speech recognition system. Thus, one option is to integrate names associated with link files into the speech recognition grammar 206. In some cases, it may be desirable to incorporate only link files that show up in a particular portion of a user interface (e.g., only link files displayed as part of the programs listed under a "START" menu).

Once the content of links has been incorporated into the grammar 206, the recognition engine can leverage the grammar to become equipped to "listen" for those words or phrases, or at least parts of the phrases. Indications of recognized words or phrases are provided to command and control application 208 to support a determination as to which software application it is that the user desires be activated. A conflict resolution process may be carried out with the user if there are multiple or no matching software applications. Those skilled in the art will appreciate that an indication of a program name other than a link file can be similarly identified from within the file system and similarly without departing from the scope of the present invention.

Thus, consistent with the described example, one way to configure system 200 is such that, when speech support is launched, at least some of the content of the file system (e.g., the content of the START menu) is examined. Application names are recorded and built into the grammar which is incorporated by the recognition engine. Subsequently, if the user utters the name (or partial name) of an application, it is matched against the grammar to support a determination as to how many applications may match what the user said (e.g., there can be many applications called 'uninstall').

One problem with constructing the grammar based only on application names is that it greatly limits the user's command vocabulary. It isn't uncommon for a user to be inclined to prefer more general terminology than specific. For example, a user that purchases a machine having a TV card might choose to say "start television" rather than "start Video Viewer 5," the latter being the actual name of the desired application. These types of misses can frustrate or discourage a user of a speech-activated command system, sometimes causing them to give up on the speech-activated functionality all together.

Figure 3:
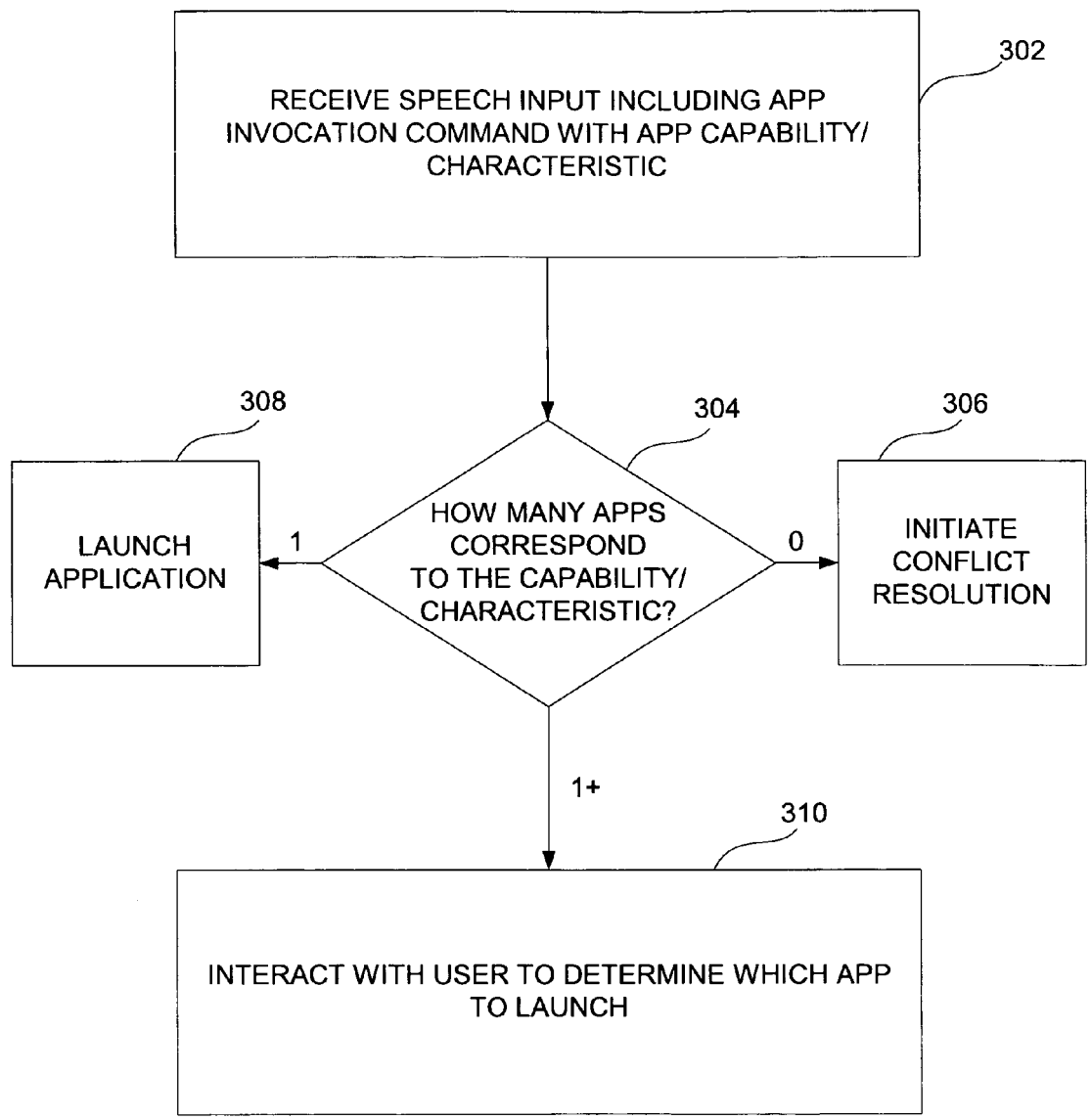
FIG. 3 is a flow chart diagram illustrating steps associated with launching an application based on speech input that includes a capability or characteristic of an application.

Thus, it is preferable to extend the user's command vocabulary to include words that are more familiar or intuitive, such as application capabilities or characteristics. FIG. 3 is a flow chart diagram illustrating steps associated with launching an application based on speech input that includes a capability or characteristic. In accordance with block 302, speech input is received and includes an action key word (e.g., start, run, launch, load, etc.) together with an application capability or characteristic (e.g., television, photo editor, music player, burner, spreadsheet, video conferencing, etc.). In accordance with block 304, a determination is made based on the input as to how many applications correspond to the spoken capability or characteristic.

If there are no corresponding applications, then, in accordance with block 306, a conflict resolution process is initiated. In accordance with block 308, if there is one corresponding application, then that application is launched (a user confirmation step can optionally be executed prior to launching). If there is more than one corresponding application, then interaction with the user is facilitated in order to determine which application is to be launched.

Any user interface means can be utilized to facilitate user selection in accordance with step 310. For example, consideration should be given to the speech command "start picture editing." There very well may be four or more applications that include a picture editor. If there are multiple corresponding applications, then the user is presented with a list of applications from which to choose. In one embodiment, the system is configured to enable the user to eliminate and/or add applications to the result set for a given speech command. It should be noted that the user interface for facilitating selection, confirmation or other user interactions can be leveraged from an existing source of such interfaces, such as the operating system. In one embodiment, a UI presented to the user includes a list of applications, wherein the UI is configured to support a narrowing of the set based on hierarchy (e.g., folder hierarchy). In one embodiment, a UI provided to the user is configured to enable the user to use the application capability information as a basis for sorting or otherwise organizing a result set.

It is worth noting that the described speech-activated command and control based on application capabilities or characteristics enables intuitive and user-friendly discovery of system resources. It is quite conceivable that a user searching to perform a particular task will discover previously unknown means for doing so. This is an added benefit of the proposed system.

One way to extend system 200 to support the functionality described in elation to FIG. 3 is to extend grammar 206 to include application capabilities and/or characteristics.

Figure 4:
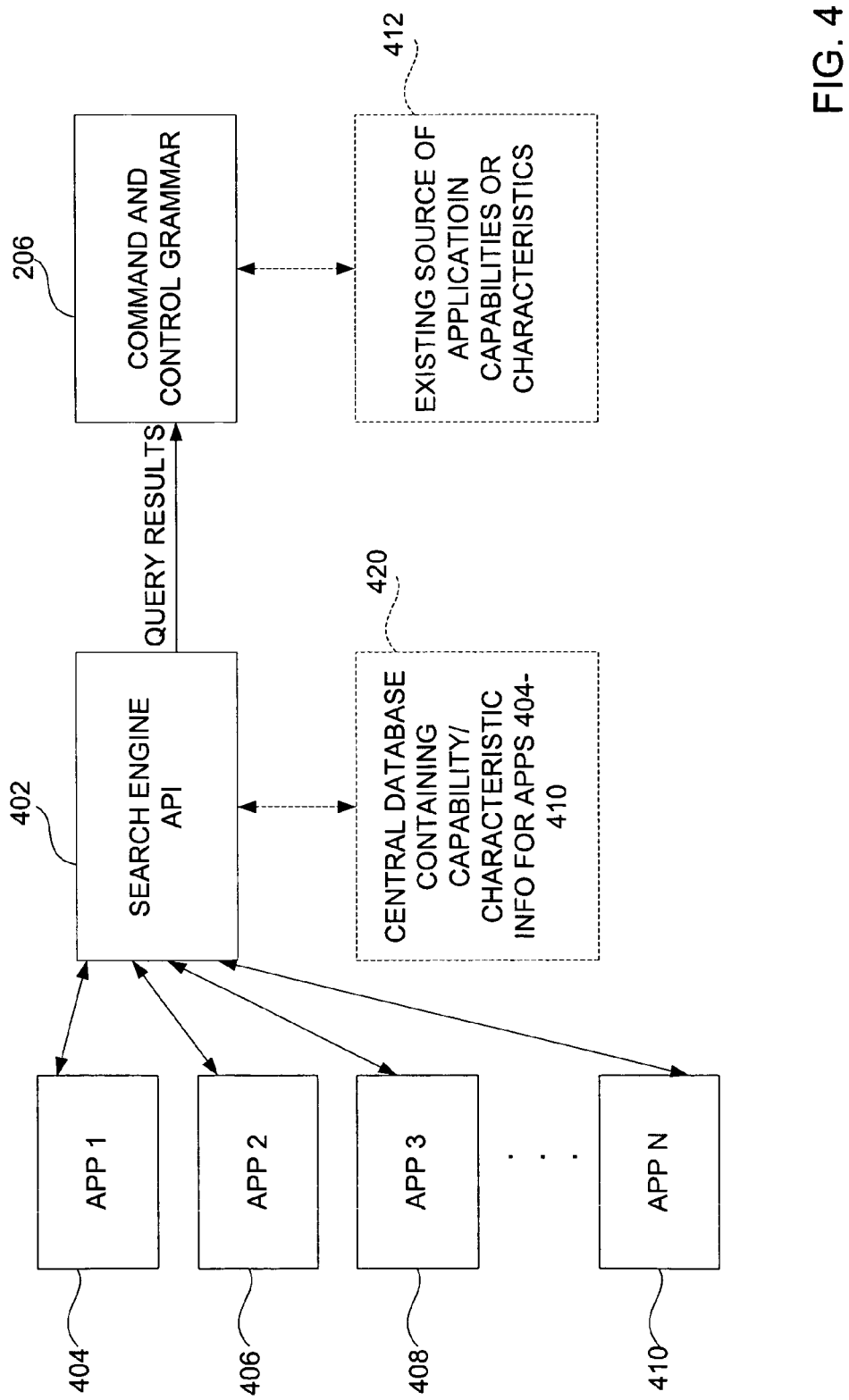
FIG. 4 is a schematic diagram demonstrating a system wherein application capability and/or characteristic data is incorporated into a grammar.

FIG. 4 is a schematic diagram demonstrating how application capability and/or characteristic data can be added to grammar 206. As is indicated by block 412, one option is to leverage a source of capability or characteristic data that exists for some other purpose. For example, some applications include a descriptive information file, such as but not limited to a so-called "tool-tip," that provides a brief description and explanation of the application. Some or all of this information can be incorporated into grammar 206 and utilized as basis for launching applications in response to speech input. Because this information is intended for a different purpose, its value as a basis for speech-activated command and control may be limited. For example, a word processing tool-tip may contain a brief description such as "create and edit text, graphics, letters, reports, web pages or email messages." It is relatively unlikely that a user is going to say "start graphics" or "start letters". Instead, the user is more likely to say "start picture editor" or "start editing pictures."

A preferable approach is for the applications to expose a richer explanation of what it is they can do. By incorporating such an explanation into the speech-activated interface, a user will gain the potential of effective and intuitive speech-activated application command and control.

Figure 5:
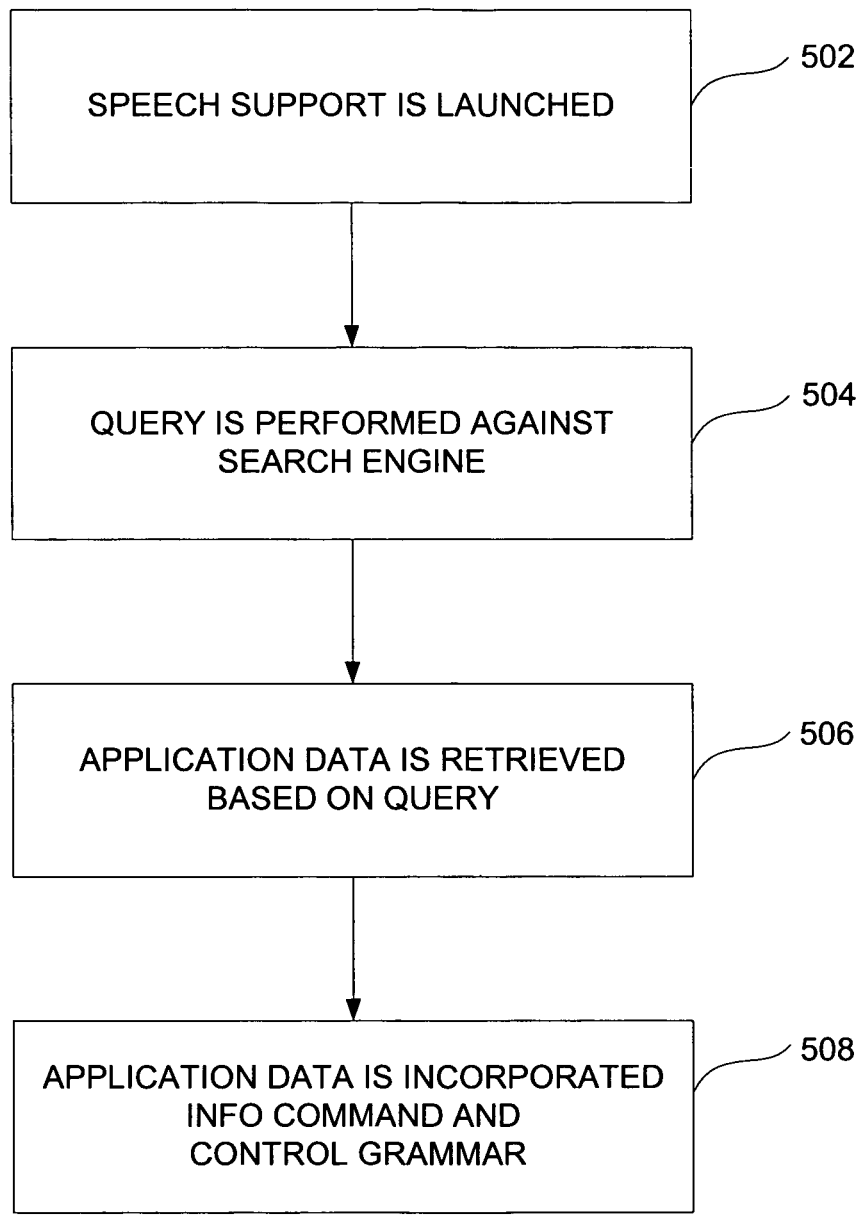
FIG. 5 is a block flow chart illustrating steps associated with enhancing a speech grammar with data pertaining to application capabilities and/or characteristics.

FIG. 5 is a block flow chart illustrating steps associated with enhancing grammar 206 with rich data pertaining to application capabilities and/or characteristics. It should be noted that the flow of FIG. 5 is generally applicable at least within the system illustrated in FIG. 4.

In accordance with block 502, speech support is launched. For example, this step might be associated with activation of the speech-activated command and control application 208 shown in FIG. 2. In accordance with block 504, a query is performed against a search engine interface, which is shown in FIG. 4 as a search engine API 402. The query illustratively requests particular attributes for a variety of applications (e.g., what is the application name, what are its capabilities/characteristics, what file should get run if the user makes a proper request, etc) Those skilled in the art will appreciate that the precise nature of a query will vary at least depending on implementation details and preferences.

As is indicated by block 506, application data is retrieved based on the query. The application data illustratively includes application capabilities and/or characteristics. Application name information may also be included in the retrieved data. In FIG. 4, search engine 402 is generally illustrated as being configured to retrieve the application data directly from a plurality of applications 404, 406, 408 and 410. This may be an over-simplification relative to actual implementation. In one embodiment, for each application, the search engine API is configured to expose a collection of extra "metadata" stored in an application-associated database. In one embodiment, the collection of metadata is separate from its related application files, for example the application files stored on a hard disk drive. In one embodiment, the metadata for multiple applications is stored for retrieval from a central database, which is designated in FIG. 4 as a central database 420 (shown in dots to indicate an alternative configuration).

In accordance with step 508 in FIG. 5, data retrieved by the search engine API is then incorporated into grammar 206 in order to provide support for a broader command and control vocabulary. In one embodiment, a user can launch an application by saying an appropriate command word (e.g., launch, run, load, open, etc.) followed by one of the application capabilities, characteristics, etc. The command execution process can be carried in a manner similar to the process described in relation to FIG. 3.

Thus, the proposed system represents an improvement over building the grammar based on a crawling of the file system for application names. Instead, search engine functionality, such as a search engine API associated with an operating system, is leveraged in order to collect rich application data. The application data illustratively comprises properties or database entries added, for example, by the application developer or manufacturer in order to expose capabilities or characteristics in a way that makes the application more accessible through means involving user-initiated, speech-activated command and control.

It is worth mentioning that additional user-created data can be similarly leveraged in the context of the described speech-activated command and control system. This user-created information can be associated to software applications to support enhanced command and control features. This enables the query for application data to be customized in many potential different ways. In one example, the query is formatted as a request for a set of applications limited only to those that the user might actually want to run. The user can illustratively configure the system to manipulate which applications will be included in the query results. For example, a user can illustratively designate an application as being one that he/or she does not want to run ever (or even be tempted to run), unless the user-set configuration is changed. An application with such a designation can illustratively be automatically filtered out of the query results. This is just one example of many different ways in which the query process can be leveraged in the command and control context.

It is, of course, conceivable that a change may occur (e.g., a new application added, an application deleted, user makes a change to a relevant attribute, etc.) after the grammar has been constructed. In one embodiment, when a relevant change has occurred, a notification comes back from the search engine API. The notification indicates that something has changed. The user may be provided with the opportunity to start the process over (e.g., reconstruct the grammar) so as to include updated data.

The described command and control scenario does not have to be limited to the software application context. The search API is extensible and generally will not be limited to an expectation of a certain kind of data. The format of a given query generally dictates what attributes are to be retrieved. A query might include a request for all things that the user should be able to initiate through a voice command (e.g., initiating applications, initiating a peripheral device, accessing data from a database, etc.).

Figure 6:
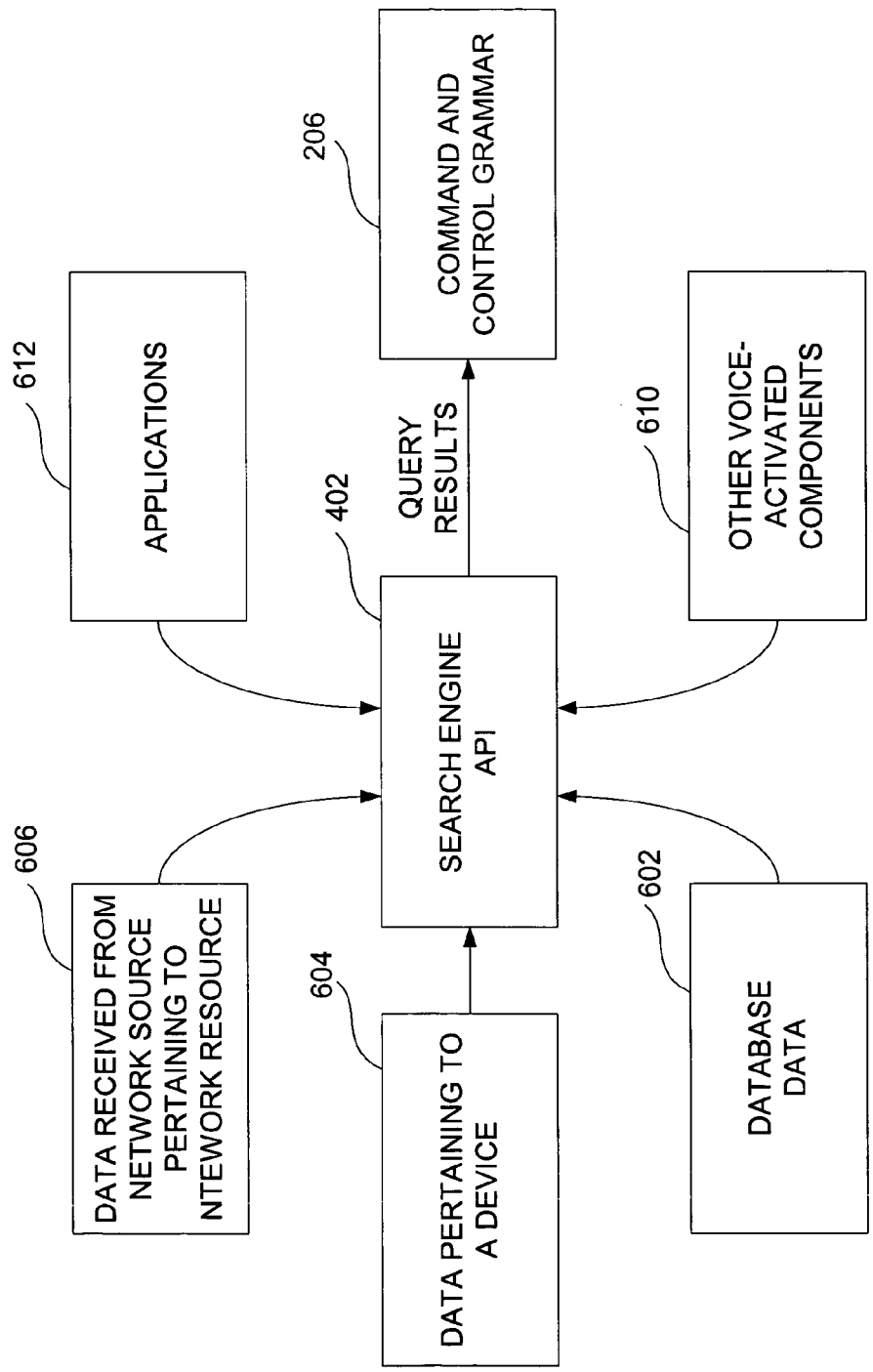
FIG. 6 is a schematic block diagram illustrating a search engine configured to supply a grammar with information derived from a broad range of different sources.

FIG. 6 is a schematic block diagram intended to demonstrate that search engine 402 can be leveraged to supply grammar 206 with information derived from a broad range of different sources, in order to support speech-initiated activation of, or access to, those different resources. Any system component that is accessible by a user and/or capable of user-activation can illustratively be associated with a set of terms that are exposed to the search engine API. These terms are retrievable by the search engine API (e.g., a query is executed upon initialization of the speech command and control system). Retrieved terms can be incorporated into grammar 206 in order to support speech-activated command and control of the associated system component.

As is shown in FIG. 6, items that can be launched or accessed based on the described command and control system include, but are not limited to, network resources (data 606), software applications (612), hardware devices (e.g., cameras, telephones, external peripheral devices, etc.)(data 604), databases (external, network-based or local) and their content (data 602), as well as any other component capable of being launched or accessed based on speech-activated commands (data 610).

In one embodiment, for components that can be speech-activated or voice-accessed, the command and control vocabulary will include support for one or more action key words that serve as an identifier that assists the command and control application in identifying which resource it is that the user wants to exploit. As has been mentioned, action key words that initiate applications can include "run, launch, load, start, etc.". A phone and its functionality can illustratively be initiated by "call, contact, talk to, etc.". These are just examples to demonstrate the point.

In one embodiment, the command and control vocabulary is also configured to support an additional identifier(s) that follows an action key word. As has been described, for an application, the command word might be an application name capability or characteristic. Providing support for other extended command vocabularies is also within the scope of the present invention. For example, the command and control system can be configured to support a phone component such that saying call+a name (e.g., "call Jerod Johnson") will cause the phone component to be activated and initiate a call to the named person (i.e., Jerod Johnson). Assumedly, the named Jerod Johnson would have been retrieved by the search engine API and incorporated into the speech grammar. Those skilled in the art will appreciate that this example is only one of many that should be considered within the scope of the present invention.

Another example will help provide further insight as to how the same architecture can be applied in command and control contexts other than the launching of applications. Consideration should be given to a scenario wherein a user's system includes a first database full of pictures and a second database full of music. With regard to the music database, in terms of the user's natural speech inclinations, the user is most likely use action words such as "play" or "listen to" (e.g., I want to play song x, or I want to listen to song y). For the picture database, the user would be more inclined to terms such as "look at" or "view" or "show." Thus, it is desirable for a speech-activated command and control system to support a retrieval of music or pictures through commands involving the noted types of intuitive activation key words.

It was noted in relation to FIG. 6 that different action key words can be assigned to different system components or resources (e.g., the music database, the picture database, and an application database are all assigned different action key words). In one embodiment, each system component or resource (or at least each that has its own assigned action key words) is associated with a particular query to be executed by the search engine API 402. The query illustratively relates to a retrieval of identifiers that could potentially follow the particular action key word.

For example, as has been described, when there is an action key word that corresponds to a software application, the query may be configured to target application names, capabilities, characteristics, or any other data that may be exposed to support a better speech-activated command and control experience for the user (e.g., "start picture editor" or "load television"). In contrast, when there is an action key word that corresponds to the music database, the query can be configured to target song name, artist information, album information, genre information, or any other information that may be exposed to support a better speech-activated command and control experience for the user (e.g., "play Billy Joel" or "listen to smooth jazz"). When there is an action key word that corresponds to the picture database, the query may be configured to target photo identifiers of photo content, information as to when photo was taken, context of a picture, or any other information that may be exposed to support a better speech-activated command and control experience for the user (e.g., "show me a picture from Christmas last year" or "show me a picture of Jason Blanco").

Thus, not only can "extra" data be associated with applications to support an improved command and control experience for the user, but data can be similarly leveraged to support intuitive access to data stored in databases. The potential for specific applications is essentially unlimited. For example, one could imagine a recipe database that is associated with action key words such as "cook, make, prepare, etc." The "extra" info exposed to the command and control system might include specific content identifiers (cuisine type, dish name, category). Based on these identifiers as incorporated into the command and control grammar, a user can target specific desired content. For example, "cook Indian food" may lead to a retrieval of all Indian food recipes in the cookbook database. Similarly, the user can request "prepare meatballs" or "make a vegetarian meal" and receive appropriate results.

In one embodiment, results are returned in a user interface that supports some degree of additional browsing by the user, for example through files arranged in a hierarchy. In one embodiment, one or more UI's are utilized to support a focusing of the user's request. For example, a user might say "prepare vegetarian meal". This command might cause the speech engine to identify many hits in the database. In such a case, a UI can be utilized to focus the search through speech or manual navigation (e.g., "There are 57 things in the database marked vegetarian, which one do you want?" or "You said play the beatles, which album do you want?).

Another example is a contacts database. This type of database can be configured to support action key words such as "talk to, dial, or call." Attributes retrieved as valid terms that follow the actin key words can include "first name+last name." Thus, a user can say "talk to Stan Jones." The terms will be recognized and the appropriate retrieval of information and action will be executed. In this case, a default call application may be accessed to actually execute the call. The action that actually occurs when proper commands are received is illustratively configurable, for example, through settings in the command and control application.

Thus, for a given database, or a given software application, or a given device, or a given network resource, or any other system component, "extra" data can be provided and leveraged in order to inform a speech-activated command and control system as to what kinds of commands and identifiers should be expected. The more components or resources that are incorporated into the architecture, the more flexible the speech interface becomes from the user's perspective.

Figure 7:
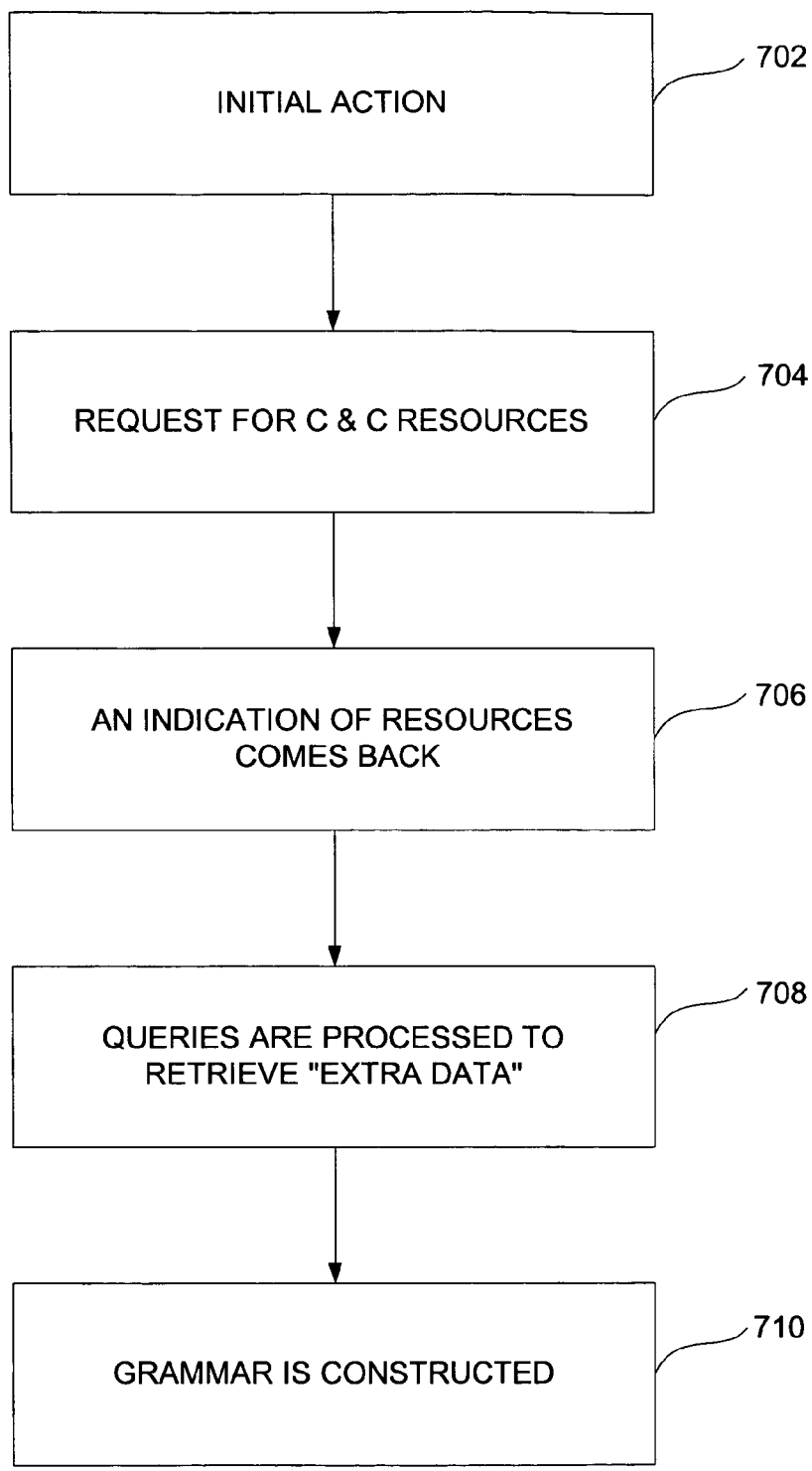
FIG. 7 is a flow chart diagram illustrating steps associated with setting up speech-activated command and control system within the context of a multi-resource system.

FIG. 7 is a flow chart diagram illustrating steps associated with steps for initializing the described speech-activated command and control functionality within the context of a multi-resource system. Those skilled in the art will appreciate that the illustrated steps represent only one example of how implementation could be accomplished.

In accordance with block 702, some action occurs that indicates that the user desires to use the speech-activated system (e.g., speech-support application is launched, loading is initiated when machine is turned on, etc.). In accordance with block 704, a request is made for system components or resources that are configured for speech-based access or activation. In accordance with block 706, an indication of the relevant system components or resources is received. In accordance with block 708, the search engine API is leveraged to perform queries for the various systems resources or components (queries for the "extra data" that supports the extended command and control vocabulary). In one embodiment, the nature of needed queries is determined based on action key words received in response to the request for resources. In accordance with bock 710, the command and control grammar is constructed so as to at least contain some of the so-called extra data. In one embodiment, the grammar is handed off to a system designed to support the speech interface (e.g., SAPI). It should be noted that, without departing from the scope of the present invention, any registration system can be utilized to obtain information about system resources or components.

Figure 8:
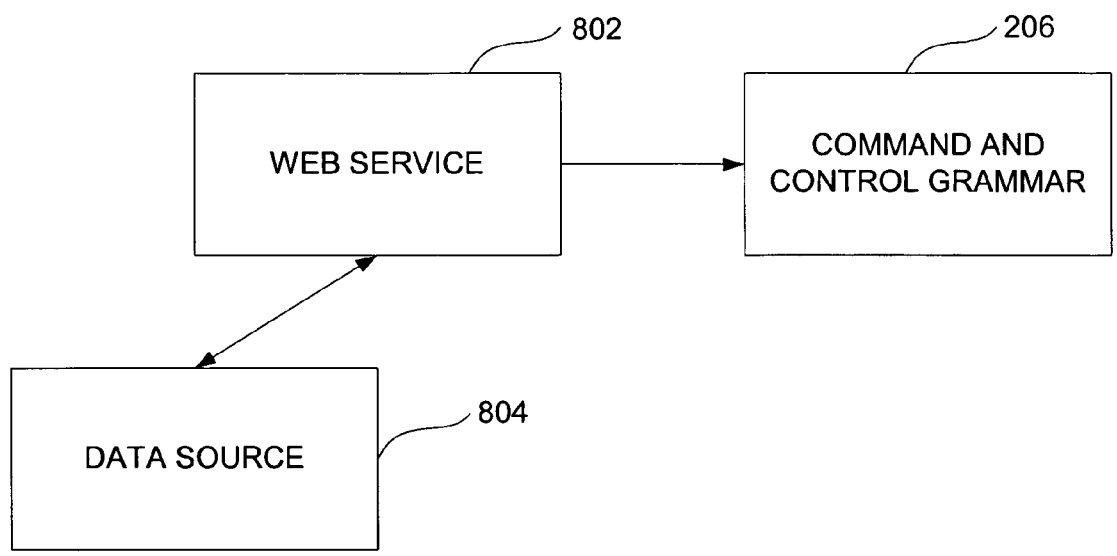
FIG. 8 is a schematic diagram illustrating a web service that serves as a tool for accessing data to enhance a speech-activated command and control system.

It should be noted that the present invention is not limited to application in the context of a local search engine API. FIG. 8 is a schematic diagram demonstrating that a web service 802 can be leveraged as a tool for accessing the data from a source 804, the data including data that is incorporated into grammar 206. For example, in one embodiment, a local examination (e.g., an examination of the hard drive) is conducted to determine all accessible applications. Based on the applications (e.g., based on their names or action key words), a web query is conducted into order to retrieve associated extra data (e.g., capability and/or characteristic data). Of course, this could just as easily be extended to system resources other than applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of supporting speech-activated user commands, the method comprising:

activating a speech-activated command and control application;

launching speech support based at least in part upon the activation of the speech-activated command and control application;

performing a plurality of queries against a search engine interface, comprising a web service, to obtain a collection of human language terms from a remote source through the web service, the human language terms pertaining to a system resource, the plurality of queries being directed locally and through the web service to a plurality of different sources, one of the plurality of different sources including a central database having application capability and characteristic information, a second one of the plurality of different sources including a descriptive information file that includes application description and explanation information, a third one of the plurality of different sources including directly obtaining information from a plurality of individual applications, wherein at least one term in the collection does not describe the identity of the system resource, wherein the plurality of queries include specifications of what should be included in the collection of human language terms, wherein the collection of human language terms includes query results received in response to the plurality of queries, and wherein content of the collection of human language terms is automatically determined, by a computer processor that is a functional component of a computer, to be consistent with said specifications;

incorporating the collection of human language terms into a grammar, wherein the grammar includes action words including run, launch, load and start, wherein the grammar defines a collection of terms that have a logical connection to the system resource, wherein the grammar also defines other terms that have logical connections to other system resources, wherein the other terms that have the logical connections to the other system resources include names of the other system resources, the names being derived based on analysis of one or more user accessible file systems;

receiving a spoken user command;
identifying a particular word included in the spoken command;
determining that the particular word included in the spoken command is included in the grammar as part of the collection of terms that have a logical connection to the system resource, and wherein the particular word included in the spoken command is one of the collection of human language terms received in response to the query;
transmitting an indication of the particular word to the speech-activated command and control application;
utilizing the speech-activated command and control application to execute one of a plurality of functions related to the system resource, wherein executing the one of the plurality of functions comprises executing the one function at least partially in response to the determination that the particular word included in the spoken command is included in the grammar as part of the collection of terms that have a logical connection to the system resource;
receiving a notification that a new system resource has been added; and
reconstructing the grammar to account for the new system resource.

2. The method of claim 1, wherein the system resource and the other system resources include network resources, hardware devices, and databases.

3. The method of claim 1, wherein:
the system resource is a software application;
obtaining the collection of terms further comprises obtaining a collection of terms that include attributes of the software application;
the collection of terms includes words that describe functions, from the perspective of a user of the software application, that the software application is configured to perform; and
the attributes of the software application include a capability of the software application.

4. The method of claim 3, further comprising:
obtaining words that describe capabilities of other software applications; and
wherein the capability of the software application and the capabilities of the other software applications include a television capability, a photo editing capability, a music player capability, a burner capability, a spreadsheet capability, and a video conferencing capability.

5. The method of claim 1, wherein:
the system resource is a particular database;
obtaining the collection of terms further comprises obtaining a collection of terms that include attributes of the particular database; and
the attributes of the particular database include a set of terms that describes content of the particular database.

6. The method of claim 2, wherein the network resources include network data resources, wherein the hardware devices include a camera, a telephone, and an external peripheral device, and wherein the databases include an external database, a network-based database, and a local database.

7. The method of claim 1, wherein:
the system resource is a remotely accessible system resource;
obtaining the collection of terms further comprises obtaining a collection of terms that describe attributes of the remotely accessible system resource; and
identifying a particular word included in the spoken command comprises capturing sound waves of a user's voice, digitizing the captured sound waves, and converting the digitized sound waves into basic language units.

8. The method of claim 1, wherein obtaining the collection of terms comprises obtaining a collection of terms from a remotely accessed central database that contains terms associated with a plurality of different system resources, the plurality of different system resources including a plurality of different software applications, wherein the plurality of different software applications are separate from the central database, and wherein, for each of the plurality of different software applications, the central database exposes a collection of extra metadata for the application.

9. The method of claim 1, wherein the system resource is a hardware device, and wherein obtaining the collection of terms further comprises obtaining a collection of terms that include attributes of the hardware device.

10. A computer-implemented, speech-activated user command system, the system comprising:
a search engine component configured to receive queries and respond by directing at least some of the queries locally and against a web service and obtaining collections of human language terms that describe system resources, and further by obtaining, through the web service, application and capability information from a remote source, wherein each of the system resources has a corresponding collection of human language terms, wherein at least one term in the collections does not describe the identity of the corresponding resource;
a command and control grammar configured to reflect the collections of terms obtained by the search engine component and including action words comprising run, launch, load and start;
a speech-activated command application configured to receive user input and analyze it based at least in part on the command and control grammar, the speech-activated command application making a determination as to how many of the system resources correspond to the user input, wherein the speech-activated command application initiates a conflict resolution process upon a determination that the user input does not correspond to any of the system resources, wherein the speech-activated command application launches a particular system resource upon a determination that the user input corresponds to one of the system resources, and wherein the speech-activated command application interacts with a user upon a determination that the user input corresponds to more than one of the system resources, the interaction with the user including presenting the user with a list of the more than one of the system resources on a user interface, the list being sortable based on application capability information and each of the more than one of the system resources in the list being capable of being selected by the user, the user interface being configured to enable the user to eliminate system resources from the list and to add system resources to the list, and the speech-activated command application further performing a confirmation step to confirm a user-selected one of the system resources before launching the system resource; and
a computer processor with memory, that is a functional part of the system and activated by the search engine component to facilitate receiving the queries and obtaining the collection of human terms and running the speech-activated command application.

11. The system of claim 10, wherein the search engine component is implemented as a web service, and wherein the system further comprises a speech recognition engine that converts the user input into phonemes.

12. The system of claim 11, wherein the collection of human language terms obtained by the search engine is a collection of terms that includes attributes of a software application, and wherein the system further comprises an operating system having a speech application program interface, the speech application program interface facilitating communication between the speech-activated command application and the speech recognition engine.

13. The system of claim 12, wherein the collection of human language terms obtained by the search engine is a collection of terms that include characteristics of a software application, and wherein the speech recognition engine incorporates a speaker profile, the speaker profile enabling the speech recognition engine to accommodate a particular user's speech pattern and accent.

14. The system of claim 10, wherein the collections of human language terms obtained by the search engine include terms that correspond to attributes of databases, and wherein the queries include requests for attributes of the system resources, requests for capabilities of the system resources, requests for characteristics of the system resources, requests for names of the system resources, and requests for files that should be run upon a proper user request.

15. The system of claim 14, wherein the queries are performed against a search engine application programming interface, and wherein the search engine application programming interface is a software layer that allows the speech-activated command application to communicate with a speech recognition engine.

16. A computer-implemented method of supporting speech-activated user commands, the method comprising:
   receiving a spoken input;
   utilizing a computer processor that is a functional component of the computer to apply a grammar to the content of the spoken input so as to identify an attribute that corresponds to a plurality of system resources, wherein the attribute defines a characteristic of the plurality of system resources without identifying the plurality of system resources by their names, one of the plurality of system resources corresponding to a first database that is associated with a first type of content and a second one of the plurality of system resources corresponding to a second database that is associated with a second type of content, each of the first and second databases being associated with particular activation key words and particular identifiers that follow the activation key words, wherein content of the grammar includes the activation key words and the identifiers, including run, launch, load and start, wherein each of the first and second databases is associated with a particular query to be executed by a search engine application programming interface to identify the associated activation key words and identifiers, wherein the content is determined at least in part based on results of execution of the queries against the search engine application programming interface (API) to a centralized database that contains the attribute of the plurality of system resources, and wherein the query identifies the plurality of system resources, the search engine API comprising at least in part a web service interface, the content being determined at least in part based on results obtained from a local source, and a remote source through the web service interface;
   receiving from a user an indication that the user does not want to run one of the system resources in the identified plurality of system resources;
   graphically presenting on a display device a list to the user, the list not including the one of the system resources that the user does not want to run, the list including the other system resources in the identified plurality of system resources;
   interacting with the user to determine one of the other system resources in the identified plurality of system resources from the list; and
   utilizing a command and control application to execute a function relative to the determined one of the other system resources.

17. The method of claim 16, further comprising:
   executing a user confirmation step prior to executing the function.

18. The method of claim 17, wherein utilizing a grammar as a basis for identifying an attribute that corresponds to a plurality of system resources comprises utilizing a grammar as a basis for identifying a characteristic of software applications, and wherein the list of the plurality of identified system resources is narrowed by the user based upon a hierarchy.

* * * * *